(12) United States Patent
Zuiko

(10) Patent No.: US 8,439,573 B2
(45) Date of Patent: May 14, 2013

(54) REPLACEABLE BEARING FOR A CONVEYOR ROLLER

(76) Inventor: Peter Zuiko, Arlington Heights, IL (US)

( * ) Notice: Subject to any disclaimer, the term of this patent is extended or adjusted under 35 U.S.C. 154(b) by 271 days.

(21) Appl. No.: 13/031,567

(22) Filed: Feb. 21, 2011

(65) Prior Publication Data
US 2012/0213458 A1 Aug. 23, 2012

(51) Int. Cl.
*B65G 13/00* (2006.01)
(52) U.S. Cl.
USPC ............................................. 384/546; 193/37
(58) Field of Classification Search .................. 384/418, 384/419, 546, 547, 586–588; 193/37
See application file for complete search history.

(56) References Cited

U.S. PATENT DOCUMENTS

| 1,642,068 | A | * | 9/1927 | Hart ............................... 384/419 |
| 1,653,817 | A | * | 12/1927 | Millspaugh .................... 384/418 |
| 3,610,387 | A | * | 10/1971 | Vom Stein ....................... 193/37 |
| 4,509,241 | A | | 4/1985 | Freeland et al. |
| 4,664,243 | A | * | 5/1987 | Martin ............................ 193/37 |
| 4,681,215 | A | * | 7/1987 | Martin ........................... 384/222 |
| 4,917,511 | A | * | 4/1990 | Katsube ......................... 384/540 |
| 5,209,581 | A | * | 5/1993 | Nagano .......................... 384/540 |
| 5,454,460 | A | | 10/1995 | Lane |
| 5,722,888 | A | | 3/1998 | Lane |
| 6,076,647 | A | | 6/2000 | Agnoff |
| 6,446,328 | B1 | | 9/2002 | Heflin |
| 6,516,942 | B2 | | 2/2003 | East |
| 6,702,091 | B2 | * | 3/2004 | Nimmo et al. .................. 193/37 |
| 6,782,996 | B1 | | 8/2004 | Wolf |
| 6,802,410 | B2 | | 10/2004 | Dyson et al. |
| 6,966,702 | B2 | | 11/2005 | Phillips |
| 7,028,825 | B2 | | 4/2006 | Scott |
| 7,341,138 | B1 | | 3/2008 | Wendt et al. |

FOREIGN PATENT DOCUMENTS
EP 112026 6/1984
* cited by examiner

*Primary Examiner* — Thomas R Hannon
(74) *Attorney, Agent, or Firm* — Richard C. Litman

(57) ABSTRACT

The replaceable bearing for a conveyor roller is installed in a bearing housing, which is removably installed within the end of the conveyor roller. The bearing housing threads into a mating insert or sleeve, which is permanently installed within the end of the conveyor roller. Alternatively, the inside of the conveyor roller may be threaded and the bearing housing threaded directly into the conveyor roller, if roller wall thickness is sufficient. The outer face of the housing includes a plurality of notches so that a mating wrench engages the notches to thread the housing and its bearing into or out of the end of the roller. The replaceable bearing allows the bearing and its housing to be replaced while retaining the conveyor roller.

20 Claims, 11 Drawing Sheets

REPLACEABLE BEARING FOR A CONVEYOR ROLLER

BACKGROUND OF THE INVENTION

1. Field of the Invention

The present invention relates generally to bearings and related supports for rotating objects, and particularly to a replaceable bearing for a conveyor roller. The bearing is installed in a bearing housing, which installs removably within the end of the conveyor roller.

2. Description of the Related Art

Conveyor systems, as operated in numerous factories, food processing plants, and other facilities, generally comprise a plurality of lateral tubular rollers facilitating the transfer of goods and materials from one point to another. The rollers may support a longitudinal belt extending the length of the conveyor run, or they may be open or exposed, i.e., devoid of a belt covering them. Moreover, they may be unpowered, i.e., depending upon gravity or a continuous supply of goods advancing other goods along the conveyor, or powered. However, all such rollers universally rotate on some form of bearing (ball, roller, plain sleeve, etc.) installed at each end thereof.

Generally, conveyor rollers are supported at each end by an axle or axle stub that is removably installed within the conveyor frame. The axle or axle stubs are generally biased outwardly at either or both ends of the roller by a coaxial spring that urges the axle or axle stub to protrude from the roller assembly into a receptacle in the conveyor frame. The conveyor roller bearings are installed on the axle or axle stubs within the ends of the roller, and the roller rotates on the bearings about the stationary axle or stubs. The axle or stub may be pushed inwardly into the end of the roller to disengage it from the conveyor frame, thus allowing the roller to be removed for maintenance or replacement. Alternatively, the axle or axle stubs may be axially fixed within the roller, with the conveyor frame having slots for the installation of the axle ends.

The conveyor roller bearings are generally permanently installed within the ends of the roller using any of a number of different means. Most such attachment means are mechanical, e.g., press fit of the bearing directly into the end of the roller, swaging the end of the roller over the bearing therein, or the use of screws through the roller and into the outer race of the bearing. All of these bearing installation means have great potential for damaging the bearing during its installation and can make removal of the bearing from the roller difficult to impossible without damaging the roller. Adhesives have also been used, but it can be difficult to achieve a good adhesive bond between the metal surface of the bearing shell and the metal or other material of which the roller is formed. Where a good bond is achieved, it can be difficult, if not impossible, to remove the bearing without damaging the roller. Accordingly, bearings in conventional conveyor rollers are permanently installed therein and typically require replacement of the entire roller assembly and its two bearings in the event of only a single bearing failure.

Thus, a replaceable bearing for a conveyor roller solving the aforementioned problems is desired.

SUMMARY OF THE INVENTION

The replaceable bearing for a conveyor roller comprises a bearing assembly wherein the bearing proper is installed in a bearing housing, which, in turn, is removably installed within the end of the conveyor roller. The bearing housing is externally threaded about at least a portion of its length. The bearing preferably seats within the unthreaded portion of the housing to avoid compressing or deforming the bearing as the threads of the housing tightly engage the mating roller structure or components. A bearing cap is installed over the outboard end of the housing, the axle or axle stub extending through the center of the bearing and through the bearing cap. The bearing cap includes a hollow stem that serves as a bushing for the inner race of the bearing. The bearing cap may be retained within the bearing and its housing by a mating retainer bushing that snaps into place about the stem of the bearing cap, or, alternatively, by a snap ring that engages a circumferential groove about the stem of the bearing cap. Alternatively, the bearing housing may incorporate a cap formed integrally therewith, in some embodiments. The bearing housing rotates in unison with the conveyor roller during operation, and the stationary axle or axle stub extends through the center of the bearing and engages a receptacle in the conveyor frame.

One embodiment of the replaceable bearing includes an insert or sleeve that is permanently affixed (e.g., swaged, pinned, spot welded, etc.) within the roller. The sleeve or insert is internally threaded to mate with the external threads of the bearing housing. Thus, the housing may be unscrewed from the insert in the roller and replaced with a new bearing and housing as needed.

Another embodiment omits the sleeve or insert. The end of the roller is internally threaded to mate directly with the bearing housing. The bearing housing may be replaced in the same manner as that described above, using an insert within the roller.

The bearing housing is preferably provided with a series of axially extending teeth or the like, facilitating removal of the housing from the roller or from the insert or sleeve installed in the roller. A mating tool may be provided to mesh with the teeth of the housing so that rotation of the tool also rotates the housing for installation or removal.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The replaceable bearing for a conveyor roller has several embodiments. Each of the embodiments includes a bearing housing removably installed within the end of the conveyor roller. The bearing (ball bearing, roller bearing, plain sleeve, etc.) may be removably installed or permanently installed within the bearing housing. The replaceable housing and bearing may be removed from the conveyor roller and replaced as required, without the need to discard the entire roller.

Figure 1:
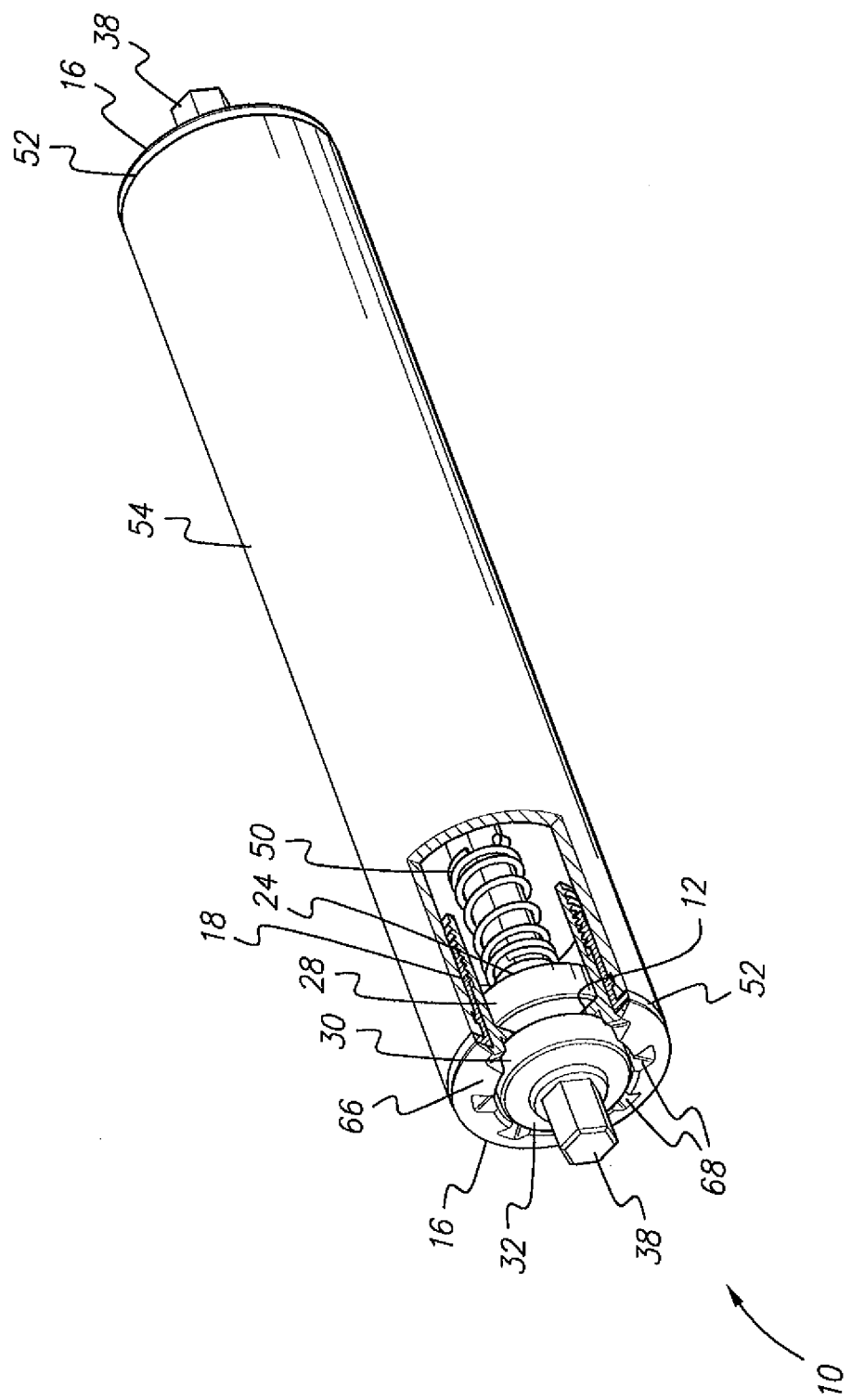
FIG. 1 is an environmental perspective view of a replaceable bearing assembly for a conveyor roller according to the present invention, a portion of the roller and the bearing assembly being broken away and partially in section to show installation of the assembly in a conveyor roller.
Figure 2:
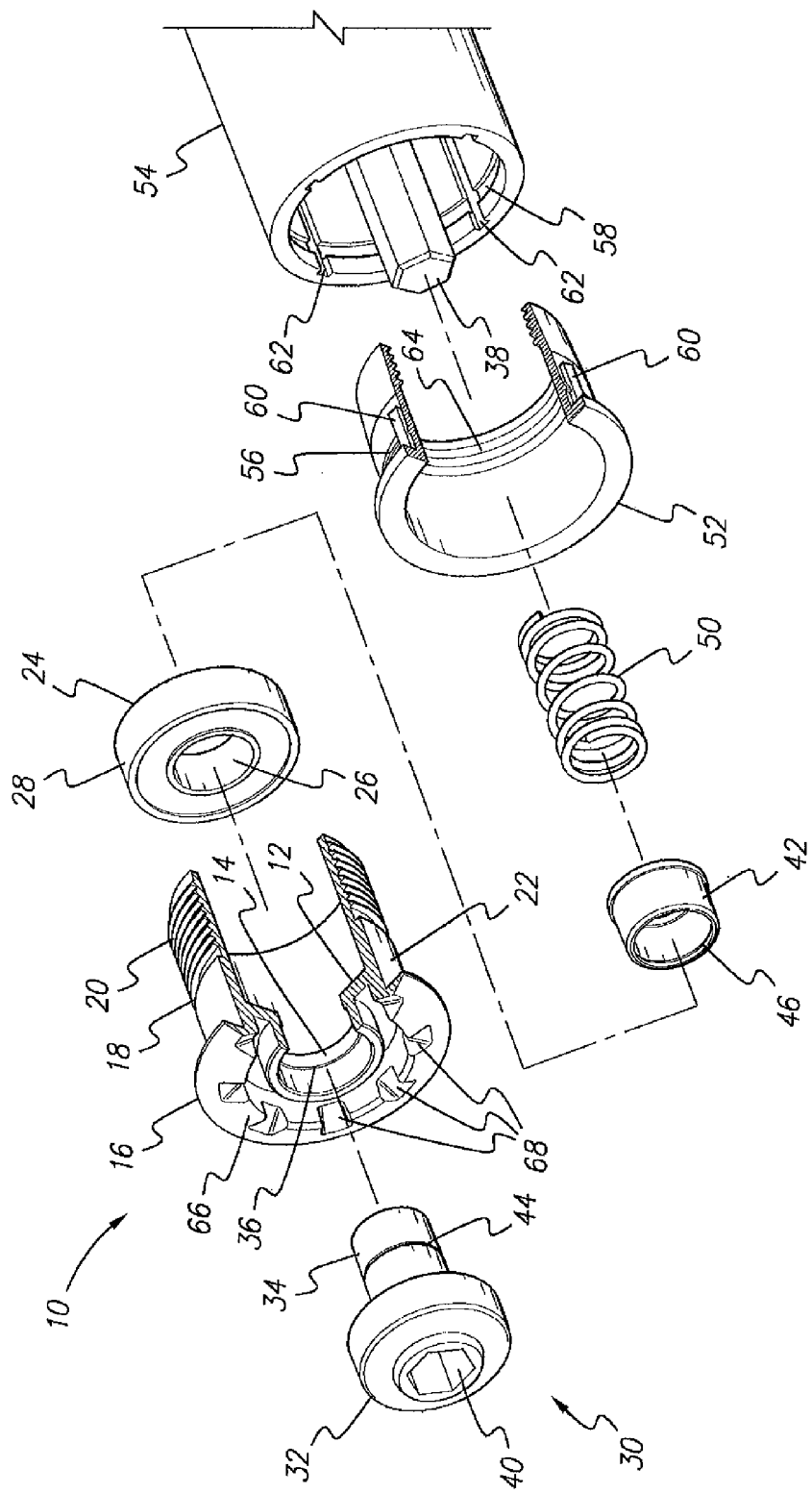
FIG. 2 is an exploded partial perspective view of the replaceable bearing assembly of FIG. 1, showing further details thereof.
Figure 3:
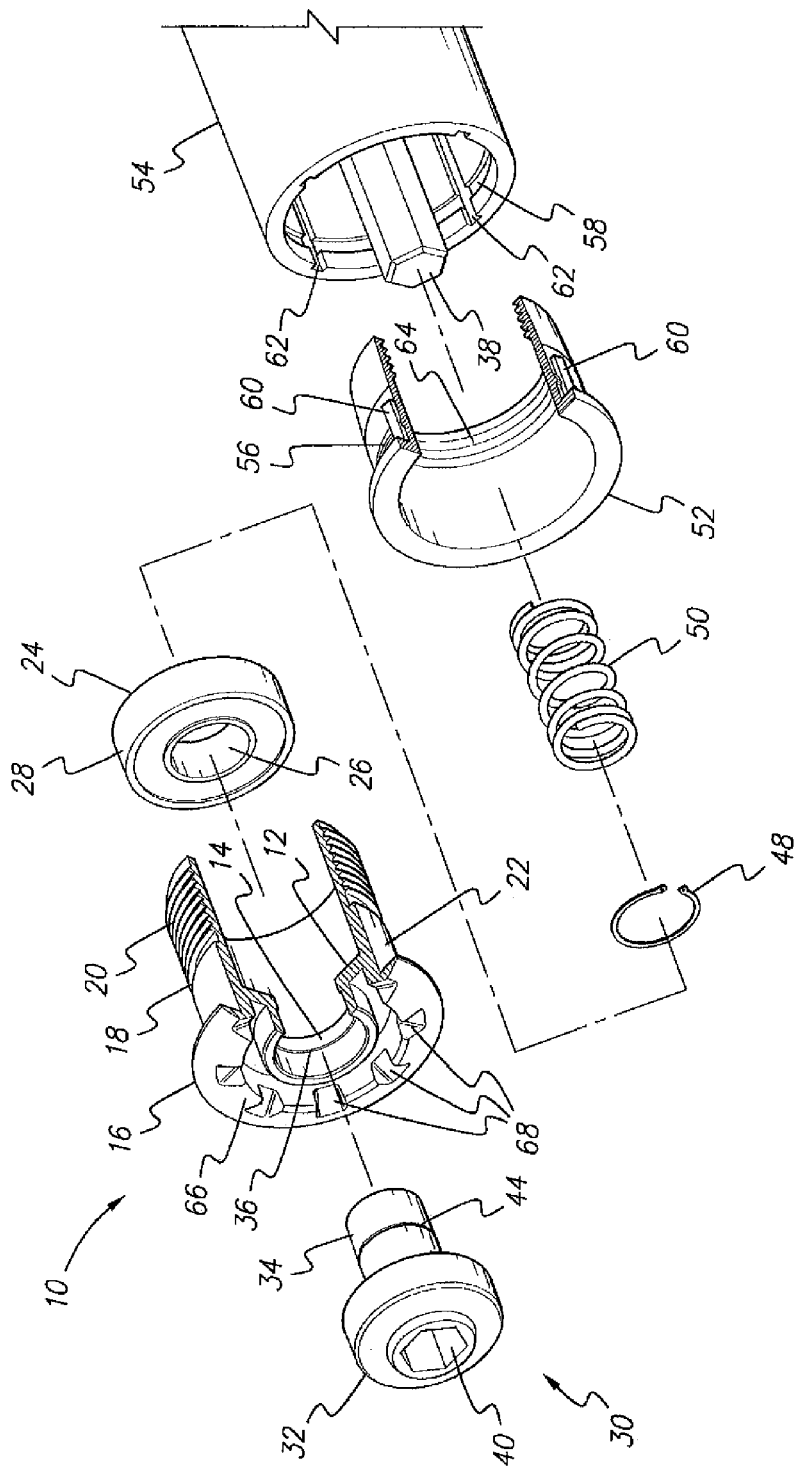
FIG. 3 is an exploded partial perspective view of an alternative embodiment of a replaceable bearing assembly for a conveyor roller according to the present invention, showing various details thereof.

FIGS. 1 and 2 of the drawings illustrate a first embodiment of the replaceable bearing and exemplary installation in a conveyor roller. FIG. 3 illustrates a closely related embodiment, differing in only one component from the embodiment of FIGS. 1 and 2. Referring to FIG. 2, a bearing housing 10 has an internal bearing seat 12 and a bearing cap passage 14 formed concentrically therethrough, and an outer retaining flange 16. An elongate bearing holder sleeve 18 connects the retaining flange 16 to the bearing seat 12 and extends beyond the bearing seat 12 to form a bearing enclosure, and also serves as a means for securing the bearing housing within the tubular roller. The bearing holder sleeve 18 includes externally disposed threads 20 about its distal portion, the portion 22 of the sleeve 18 adjacent the bearing seat 12 being unthreaded, as shown most clearly in FIGS. 2 and 3. Alternatively, the bearing holder sleeve 18 may be threaded along its entire length, if desired. A bearing 24 (e.g., sleeve, roller, tapered roller, needle, etc.) having an inner race 26 (or surface, in the case of a plain bearing or bushing) and outer race, shell, or surface 28 is seated within the bearing holder sleeve 18 adjacent the bearing seat 12.

A bearing cap 30 has a relatively large diameter head 32 that seats within the center of the retaining flange 16 of the bearing housing 10, and a narrower diameter hollow stem 34 that inserts through the bearing cap passage 14 of the bearing housing 10. The bearing cap passage 14 may have a circumferential groove or rib 36 therein, which engages a mating circumferential rib or groove (not shown) about the stem 34 of the bearing cap 30 to assist in retaining the bearing cap within the bearing housing 10. However, the retention of the bearing 24 on the bearing cap stem 34 essentially accomplishes this as well, as described further below. The bearing housing 10 and bearing cap 30 may be formed of plastic or other suitably resilient material to allow the engagement of their mating rib and groove structure. Alternative materials (e.g., certain metals, etc.) may be used for either or both components. The stationary (non-rotating) axle 38 of the roller assembly extends through the axle passage 40 in the bearing cap head 32 and stem 34, the end of the axle 38 being secured in the frame of the conveyor system for operation. The axle 38 may have a non-circular cross section, as shown in FIGS. 1 through 4, the non-circular cross section of the axle passage 40 of the bearing cap head 32 and stem 34 fitting closely about the axle 38 and remaining stationary with the axle. Alternative bearing housing, bearing cap, and axle configurations are illustrated in subsequent drawings and discussed further below.

The bearing 24 is retained on the bearing cap stem 34 by a bearing retainer, e.g., a bushing 42 in the embodiment of FIG. 2. The stem 34 of the bearing cap 30 has a circumferential groove 44 therearound. The bushing 42 has a mating internal circumferential rib or ring 46 that engages the groove 44 of the bearing cap stem 34 when assembled therewith. The assembly is accomplished by inserting the stem 34 of the bearing cap 32 through the bearing cap passage 14 of the bearing housing 10, and installing the bearing 24 on the bearing cap stem 34 within the bearing holder sleeve 18 of the bearing housing. The bearing housing 10 preferably provides a tight fit about the outer race or surface 28 of the bearing 24. The inner race or surface 26 of the bearing fits tightly about the stem 34 of the bearing cap 30. This may be accomplished without concern for bearing deformation by forming the bearing housing 10 and bearing cap 30 of sufficiently flexible materials, as noted further above.

The bushing 42 is then installed on the bearing cap stem 34, and the internal ring or rib 46 of the bushing 42 snaps into place in the mating groove 44 of the bearing cap stem 34 to secure the bearing 24 on the stem 34 of the bearing cap 30. This captures the bearing 24 between the bearing seat 12 of the bearing housing 10 and the bushing 42 to complete the assembly. The assembly may then be installed within the end of the roller, as described further below. The only difference between the embodiment of FIG. 2 and the embodiment of FIG. 3 is the use of a snap ring 48 to engage the circumferential groove 44 of the bearing cap stem 34, rather than using the bushing 42 illustrated in FIG. 2. A compression spring 50 is captured on either or both ends of the axle 38 between a swage or other stop (not shown) and the bushing 42. The spring 50 urges the axle 38 toward its opposite end. Two such springs in each end of the roller balance one another and permit the axle to be retracted momentarily from either end to allow the installation or removal of the roller assembly in the conveyor frame. Alternatively, a single spring may urge the axle 38 toward its opposite end, where further axial motion is stopped by swages (or other means).

In the example of FIGS. 2 and 3, an intermediate tubular insert or sleeve 52 is permanently installed in the end of the hollow tubular roller 54. The insert 52 and roller 54 may be formed of any suitable grade or type of plastic, or even various metals. The insert 52 is permanently and immovably affixed within the roller 54 by any of a number of suitable means, e.g., adhesives, sonic welding, swaging or other mechanical attachment, etc., depending upon the specific materials used. In the example of FIGS. 2 and 3, the insert 52 includes an external circumferential ring or rib 56, and the roller 54 has a mating internal circumferential groove 58. The engagement of the ring or rib 56 of the insert 52 with the mating groove 58 of the roller 54 retains the insert 52 within the roller 54. Alternatively, the insert 52 may have an external circumferential groove and the roller 54 may have an internal circumferential rib. The insert 52 further includes at least one axially disposed key 60, the interior surface of the roller 54 having a corresponding number of mating keyways 62 formed therein.

The engagement of the insert key(s) 60 with the corresponding keyway(s) 62 within the roller 54 prevents the insert 52 from rotating within the roller 54. The provision of an insert 52 with internal threads 64 to engage the external threads 20 of the bearing housing sleeve 18 permits the removable threaded installation of the bearing housing 10 within the end of the roller 54 without weakening the roller 54 by cutting internal threads therein.

Figure 4:
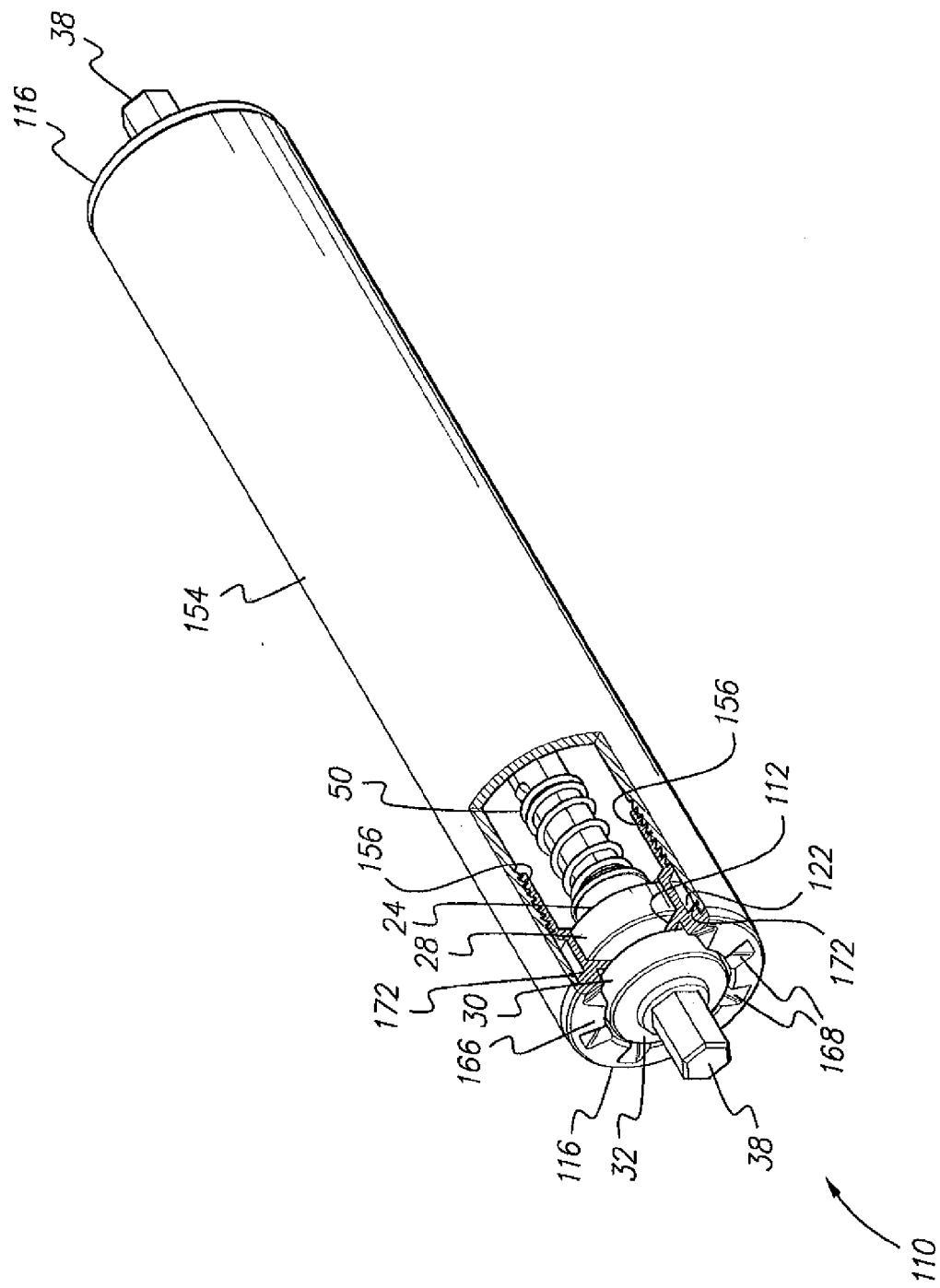
FIG. 4 is an environmental perspective view of another alternative embodiment of a replaceable bearing assembly for a conveyor roller according to the present invention, the roller and the bearing assembly being broken away and partially in section to show installation of the assembly in a conveyor roller.
Figure 5:
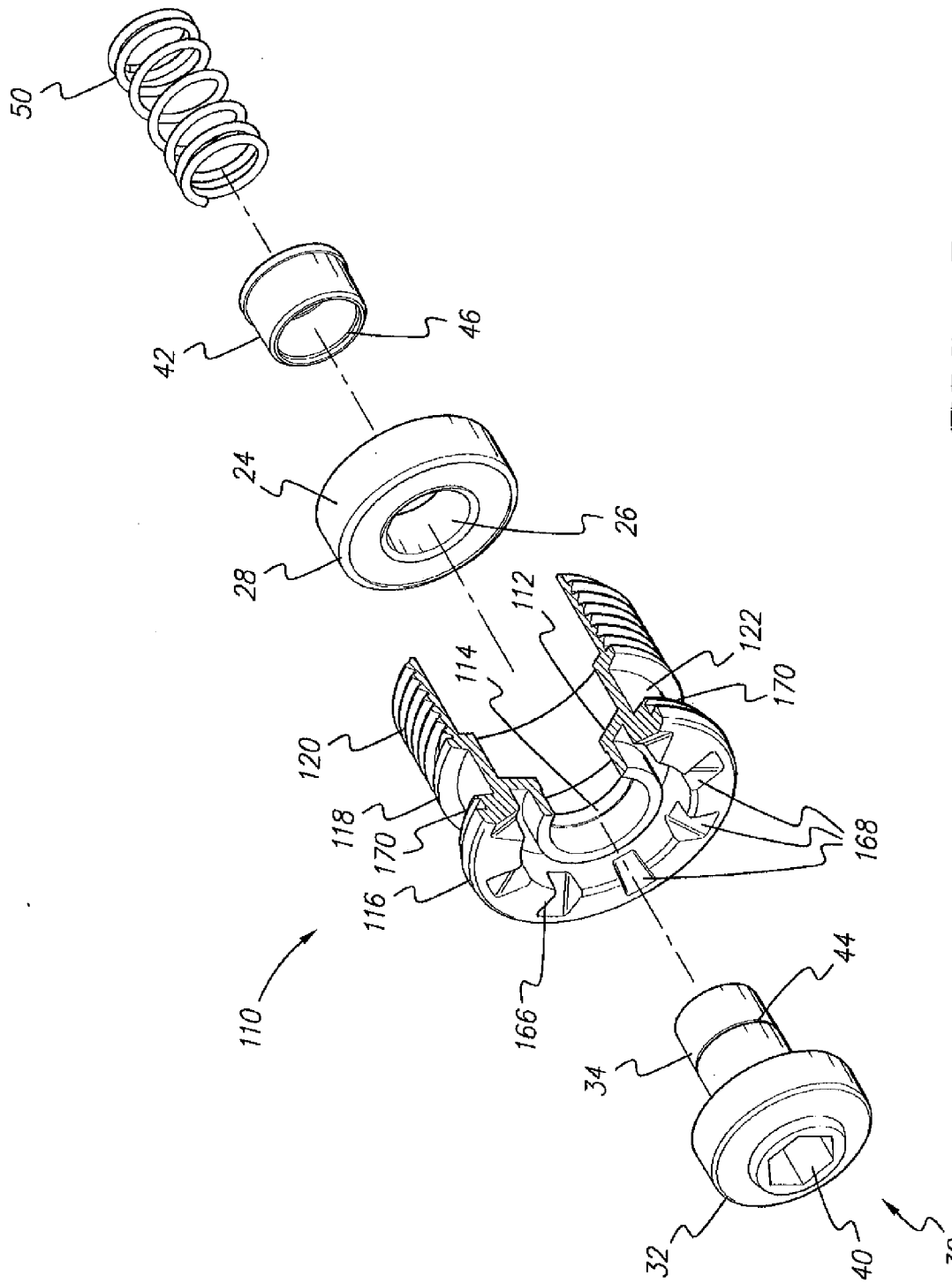
FIG. 5 is an exploded perspective view of the replaceable bearing assembly of FIG. 4, showing further details thereof.
Figure 6:
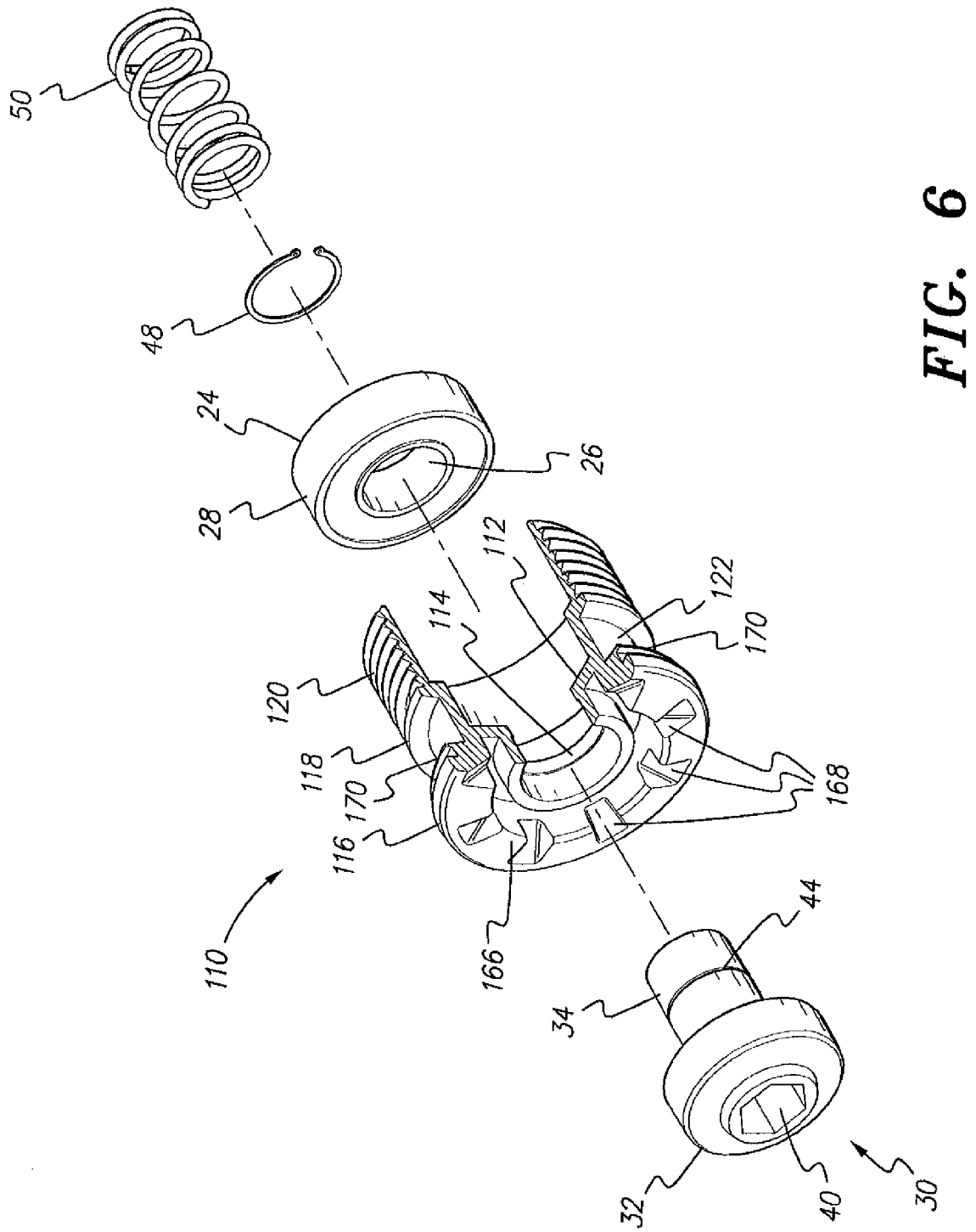
FIG. 6 is an exploded perspective view of another alternative embodiment of a replaceable bearing assembly for a conveyor roller according to the present invention, showing various details thereof.

However, there may be cases where the conveyor roller has sufficient strength and/or thickness to permit threads to be cut into the interior wall of the conveyor roller, thereby allowing the bearing housing to be threaded directly into the roller and precluding the need for an intermediate insert. FIGS. 4 through 6 illustrate such an embodiment. Most of the components illustrated in FIGS. 5 and 6, i.e., the bearing 24, bearing cap 30, bearing retaining means (bushing 42 or snap ring 48), and spring 50 are identical to those like-numbered components in FIGS. 1 through 3. However, the bearing housing of the embodiments of FIGS. 4 through 6 differs from the corresponding bearing housing component 10 of FIGS. 1 through 3, and the assembly of FIGS. 4 through 6 further differs from the assembly of FIGS. 1 through 3 in that the assembly of FIGS. 4 through 6 does not include an intermediate insert within the roller.

The bearing housing 110 of FIGS. 4 through 6 is shown in detail in FIGS. 5 and 6. The bearing housing 110 includes a bearing seat 112, a bearing cap passage 114 extending concentrically outwardly from the seat 112, an outer retaining flange 116, and a bearing holder sleeve 118 having an externally threaded distal portion 120. However, it will be noted in this embodiment that the unthreaded portion 122 of the sleeve adjacent to the bearing seat 112 is a narrower diameter than the threaded portion 120, or more accurately, the threaded portion 120 has a larger diameter than the unthreaded bearing containment portion 122. The larger diameter threaded portion 120 of the bearing housing 110 of FIGS. 4 through 6 is due to the lack of an intermediate insert disposed between the bearing holder sleeve 118 and the inner wall of the roller. Thus, the threaded portion 120 of the sleeve 118 may have a larger diameter than the unthreaded bearing containment portion 122 of the sleeve to allow identical bearings 24 to be used in both embodiments. This also has the advantage of spacing the wall of the bearing containment portion 122 of the sleeve 118 away from the wall of the conveyor roller, thus assuring that the roller does not put any compressive pressures on the bearing containment portion 122 of the sleeve 118, which might possibly compress or deform the outer race or surface 28 of the bearing 24. Alternatively, the threaded portion of the sleeve may extend continuously for the entire length of the sleeve, if desired.

It will be noted in FIG. 4 of the drawings that the conveyor roller 154 includes an internally threaded portion 156 near the end thereof. As noted further above, the roller 154 may be threaded internally if the wall thickness and/or material strength is sufficient to permit such internal threading, thereby precluding the need for an additional insert component and the means for securing such an insert within the roller. In the embodiment of FIGS. 4 through 6, the threaded portion 120 of the bearing holder sleeve 118 of the housing 110 threads directly into the mating internal threads 156 of the conveyor roller 154 for installation and removal, thus simplifying the assembly.

The bearing housing 110 and its roller 154 further include means for preventing the housing from unscrewing from the roller during operation. The bearing housing 110 of FIGS. 5 and 6 includes a circumferential ring 170 adjacent the outer retaining flange 116 of the housing 110. A careful examination of FIG. 4 will reveal a corresponding circumferential internal groove 172 immediately within the end of the roller 154. (Alternatively, the ring and groove may be interchanged between the roller and bearing housing, if desired.) As the bearing housing 110 is screwed into the end of the roller 154, the slight protrusion of the ring 170 is forced into the end of the roller 154. When the housing 110 is seated properly within the end of the roller 154, the ring 170 snaps into place within the mating groove 172 of the roller 154. If a rotary force is imparted to the bearing housing 110 in a direction that would cause it to unscrew from the roller 154, the ring 170 of the bearing housing 110 is forced against the outer lip of the roller groove 172, and thus cannot back out of its seated installation within the roller 152. If it becomes necessary to remove the bearing housing 110 from its installation in the end of the roller 152, some additional torque must be applied to "break loose" the bearing housing retaining ring 170 from the retaining groove 172 of the roller 152 and cause the ring 170 to back out of its seated position within the groove 172. Once this has been accomplished, the bearing housing 110 may be removed from its roller 152 with no further problem.

Figure 7:
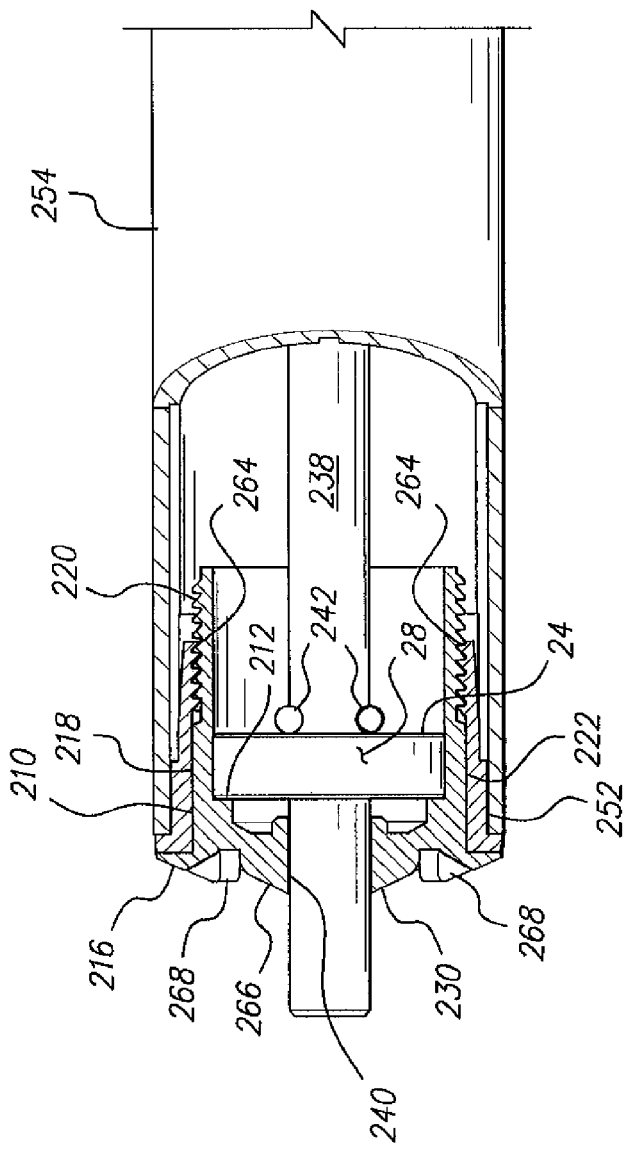
FIG. 7 is a side elevation view in section of another alternative embodiment of a replaceable bearing assembly for a conveyor roller according to the present invention, showing various details thereof.
Figure 8:
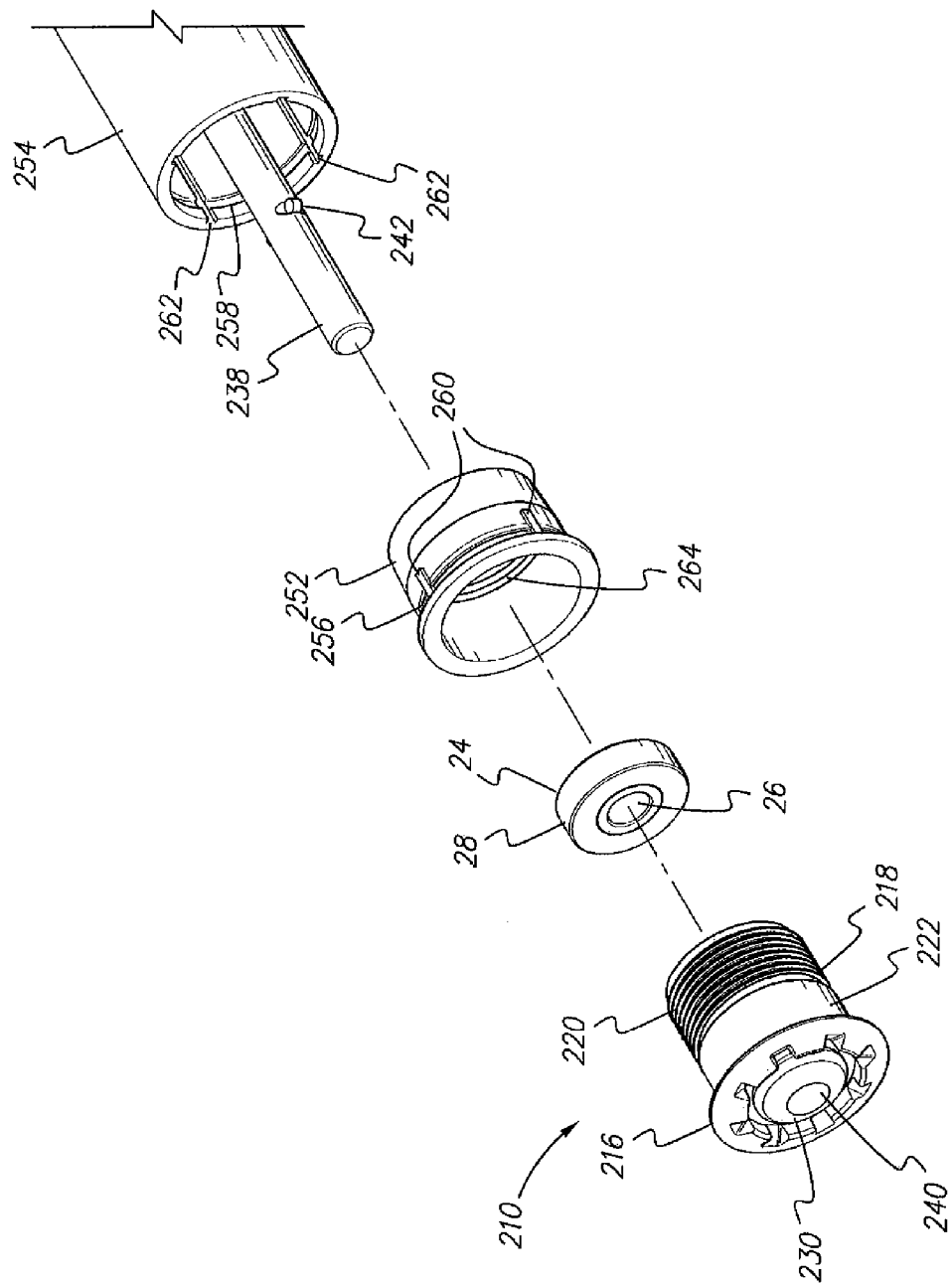
FIG. 8 is an exploded partial perspective view of the bearing assembly of FIG. 7, showing various details thereof.

FIGS. 7 through 10 of the drawings illustrate an additional two embodiments of the replaceable bearing for a conveyor roller. FIGS. 7 and 8 illustrate an embodiment wherein the biasing spring on the roller shaft or axle is deleted, wherein the bearing cap is formed as an integral component with the bearing housing, and wherein the assembly is installed on a roller axle having a round cross section. FIGS. 7 and 8 illustrate a bearing housing 210 having a bearing seat 212, an outer retaining flange 216, and a bearing holder sleeve 218 having an externally threaded distal portion 220. However, it will be noted in this embodiment that the unthreaded portion 222 of the sleeve adjacent to the bearing seat 212 has a diameter substantially equal to the major diameter of the threaded distal portion 220. Alternatively, the threaded portion 220 of the bearing holder sleeve 218 may extend continuously for the entire length of the sleeve 218, and/or the insert 252 may have an unthreaded portion having a larger internal diameter than its threaded portion, allowing the unthreaded portion 222 of the bearing holder sleeve 218 to have a larger diameter than its threaded portion 220, if desired. A bearing 24 (e.g., sleeve, roller, tapered roller, needle, etc.) having an inner race 26 (or surface, in the case of a plain bearing or bushing) and outer race, shell, or surface 28 is seated within the unthreaded portion 222 of the bearing holder sleeve 218 adjacent the bearing seat 212.

The bearing housing 210 includes an outer end 230 formed integrally therewith that serves the same function as the separate bearing cap 30 of the embodiments of FIGS. 1 through 6. The stationary (non-rotating) axle 238 of the roller assembly extends through the axle passage 240 in the outer end 230 of the bearing housing 210, the end of the axle 238 being secured in the frame of the conveyor system for operation. The axle 238 may have a circular cross section, as shown in FIGS. 7 and 8, the circular cross section of the axle passage 240 of the bearing housing outer end 230 fitting closely about the axle 238 and remaining stationary with the axle 238. Another alternative bearing housing with its outer end and axle configuration is illustrated in FIGS. 9 and 10, and discussed further below.

In the embodiment of FIGS. 7 and 8, the bearing 24 is retained against the bearing seat 212 of the bearing housing 210 by one or more swaged protrusions 242 or other retaining means disposed upon the axle 238. The assembly is accomplished by installing the bearing 24 against its bearing seat 212 within the bearing housing 210, and then installing the bearing housing 210 in its insert 252, which is previously installed within the end of the roller 254. The bearing housing 210 preferably provides a tight fit about the outer race or surface 28 of the bearing 24. The inner race or surface 26 of the bearing fits tightly about the axle 238. This may be accomplished without concern for bearing deformation by forming the bearing housing 210 and its integral outer end portion 230 of sufficiently flexible materials, as noted further above. The opposite end of the roller 254 and axle 238 assembly may be configured in the same manner, i.e., with the bearing 24 seated within its housing 210 by swages 242 or other suitable means on the axle 238. This configuration, with its lack of springs and inability to provide axial movement of the axle 238, would be used in conveyor systems where the axle receptacles in the conveyor frame comprise slots to allow the axle to be lifted from the slots, rather than retracted from a passage.

In the example of FIGS. 7 and 8, an intermediate tubular insert or sleeve 252 is permanently installed in the end of the hollow tubular roller 254. The insert 252 and roller 254 may be formed of any suitable grade or type of plastic, or even various metals. The insert 252 is permanently and immovably affixed within the roller 254 by any of a number of suitable means, e.g., adhesives, sonic welding, swaging or other mechanical attachment, etc., depending upon the specific materials used. In the example of FIGS. 7 and 8, the insert 252 includes an external circumferential ring or rib 256, and the roller 254 has a mating internal circumferential groove 258. The engagement of the ring or rib 256 of the insert 252 with the mating groove 258 of the roller 254 retains the insert 252 within the roller 254. Alternatively, the insert 252 may have an external circumferential groove and the roller 254 may have an internal circumferential rib. The insert 252 further includes at least one axially disposed key 260, the interior surface of the roller 254 having a corresponding number of mating keyways 262 formed therein. The engagement of the insert key(s) 260 with the corresponding keyway(s) 262 within the roller 254 prevents the insert 252 from rotating within the roller 254. The provision of an insert 252 with internal threads 264 to engage the external threads 220 of the bearing housing sleeve 218 permits the removable threaded installation of the bearing housing 210 within the end of the roller 254 without weakening the roller 254 by cutting internal threads therein.

Figure 9:
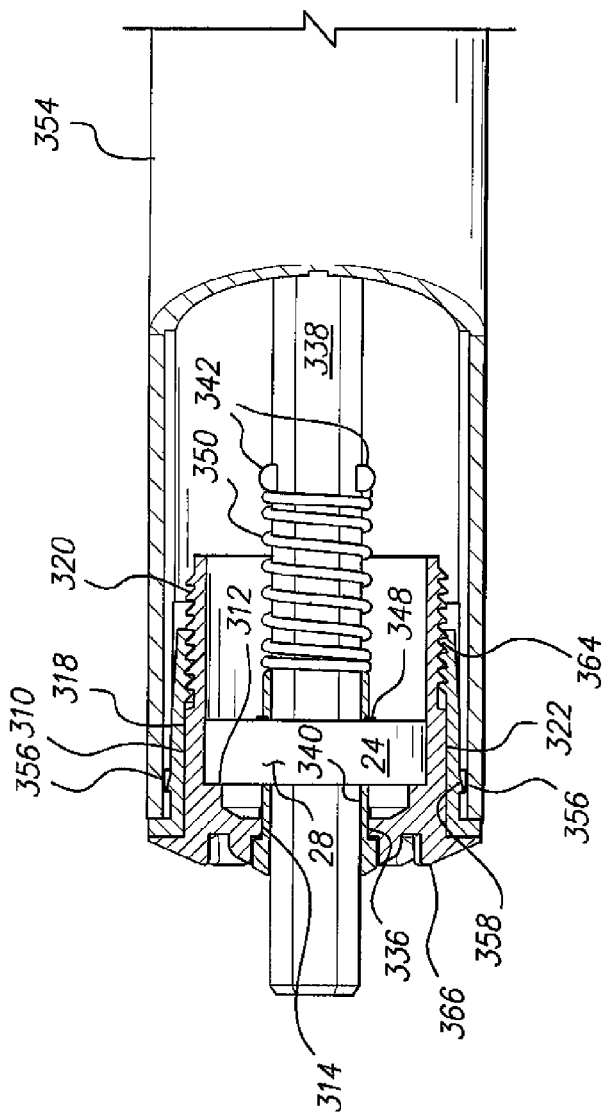
FIG. 9 is a side elevation view in section of another alternative embodiment of a replaceable bearing assembly for a conveyor roller according to the present invention, showing various details thereof.
Figure 10:
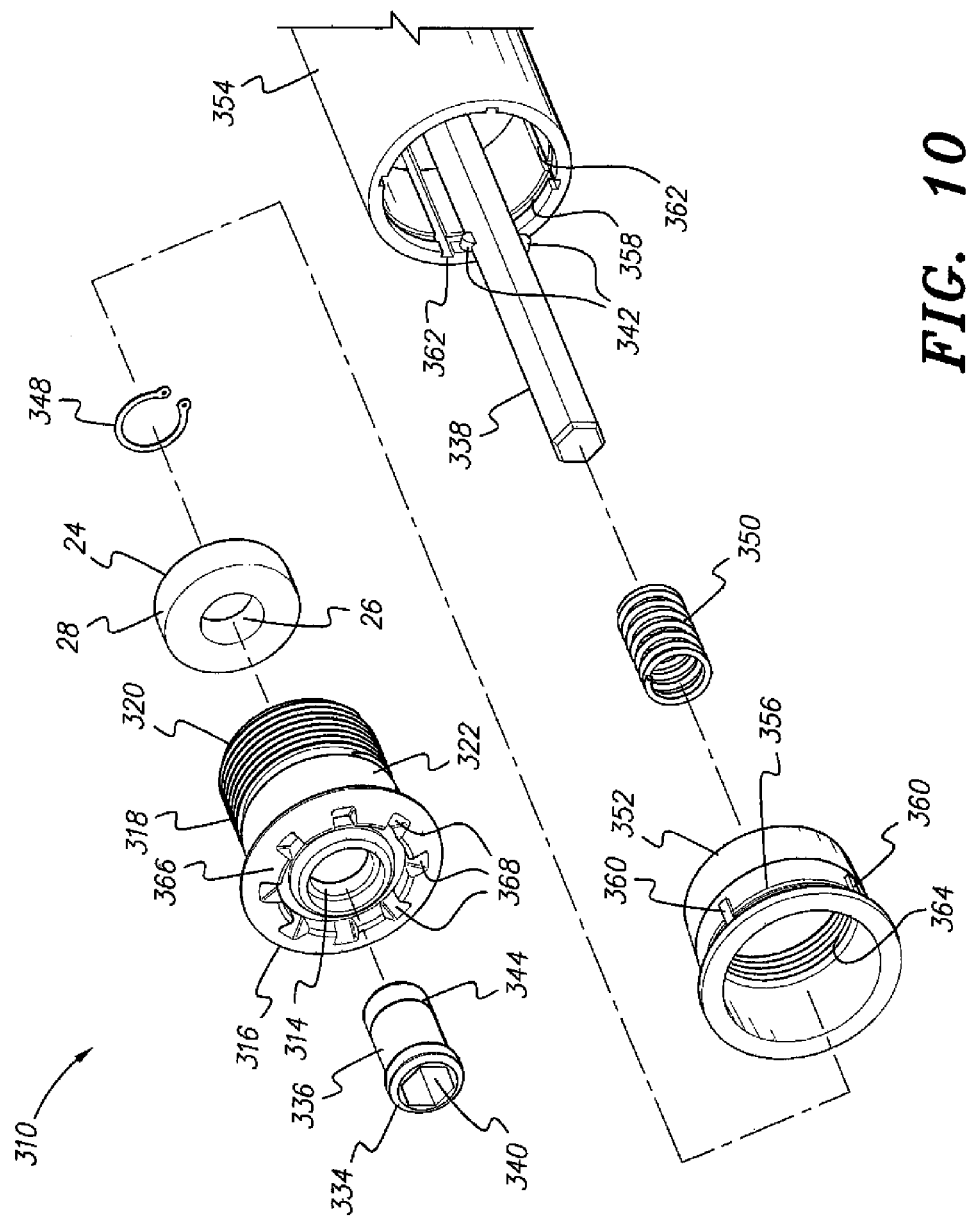
FIG. 10 is an exploded partial perspective view of the bearing assembly of FIG. 9, showing various details thereof.

FIGS. 9 and 10 of the drawings illustrate still another embodiment of the replaceable bearing and exemplary installation in a conveyor roller. This embodiment is similar to that of FIGS. 1 and 2, except for the bearing cap structure. In the embodiment of FIGS. 9 and 10, the bearing housing 310 has an internal bearing seat 312, and the bearing cap is formed as an integral component with the bearing housing 310, the assembly being installed on a roller axle having a non-circular cross section. The integral cap portion of the bearing housing 310 further includes a bushing passage 314 formed concentrically therethrough. The bearing housing 310 further includes an outer retaining flange 316 and a bearing holder sleeve 318 having an externally threaded distal portion 320. This embodiment has an unthreaded portion 322 of the sleeve adjacent to the bearing seat 312 having a diameter substantially equal to the major diameter of the threaded distal portion 320. Alternatively, the threaded portion 320 of the bearing holder sleeve 310 may extend continuously for the entire length of the sleeve 318, and/or the insert may have an unthreaded portion having a larger internal diameter than its threaded portion, allowing the unthreaded portion 322 of the bearing holder sleeve 310 to have a larger diameter than its threaded portion 320, if desired. A bearing 24 (e.g., sleeve, roller, tapered roller, needle, etc.) having an inner race 26 (or surface, in the case of a plain bearing or bushing) and outer race, shell, or surface 28 is seated within the unthreaded portion 322 of the bearing holder sleeve 318 adjacent the bearing seat 312.

An elongate bearing holder sleeve 318 connects the retaining flange 316 to the bearing seat 312 and extends beyond the bearing seat 312 to form a bearing enclosure, and also serves as a means for securing the bearing housing 310 within the tubular roller. The bearing holder sleeve 318 includes externally disposed threads 320 about its distal portion, the portion 322 of the sleeve 318 adjacent the bearing seat 312 being unthreaded. Alternatively, the bearing holder sleeve 318 may be threaded along its entire length, if desired. A bearing 24 (e.g., sleeve, roller, tapered roller, needle, etc.) having an inner race 26 (or surface, in the case of a plain bearing or bushing) and outer race, shell, or surface 28 is seated within this unthreaded portion 322 of the bearing holder sleeve 318 adjacent the bearing seat 12.

It will be noted that the roller axle or shaft 338 of FIGS. 9 and 10 has a non-circular cross section. Accordingly, an adapter bushing 334 is installed within the passage 314 of the bearing housing 310. The bushing 334 has an outer diameter or surface 336 configured to fit closely within the passage 314 of the bearing housing 310, and an inner passage 340 configured to fit the contours of the non-circular cross-section of the roller axle 338. The adapter bushing 334 includes a circumferential groove 344, and a snap ring 348 secures within the groove 344 to capture the bearing against its seat 312 within the bearing housing 310 to prevent the adapter bushing 334 from backing out from its installation within the passage 314 of the housing 310. The assembly is accomplished by inserting the stem of the adapter bushing 334 through the passage 314 of the bearing housing 310 and installing the bearing 24 on the adapter bushing 334 within the bearing holder sleeve 318 of the bearing housing 310. The bearing housing 310 preferably provides a tight fit about the outer race or surface 28 of the bearing 24. The inner race or surface 26 of the bearing fits tightly about the outer surface 336 of the adapter bushing 334. This may be accomplished without concern for bearing deformation by forming the bearing housing 310 and adapter bushing 334 of sufficiently flexible materials, as noted further above.

A compression spring 350 is captured on either or both ends of the axle 338 between a swage or other stop 342 and the adapter bushing 334. The spring 350 urges the axle 338 toward its opposite end. Two such springs 350 in each end of the roller balance one another and permit the axle 338 to be retracted momentarily from either end to allow the installation or removal of the roller assembly in the conveyor frame. Alternatively, a single spring 350 may urge the axle 338 toward its opposite end, where further axial motion is stopped by swages (or other means). As another alternative, the springless system of the embodiment of FIGS. 7 and 8 may be incorporated with the embodiment of FIGS. 9 and 10, if desired.

Figure 11:
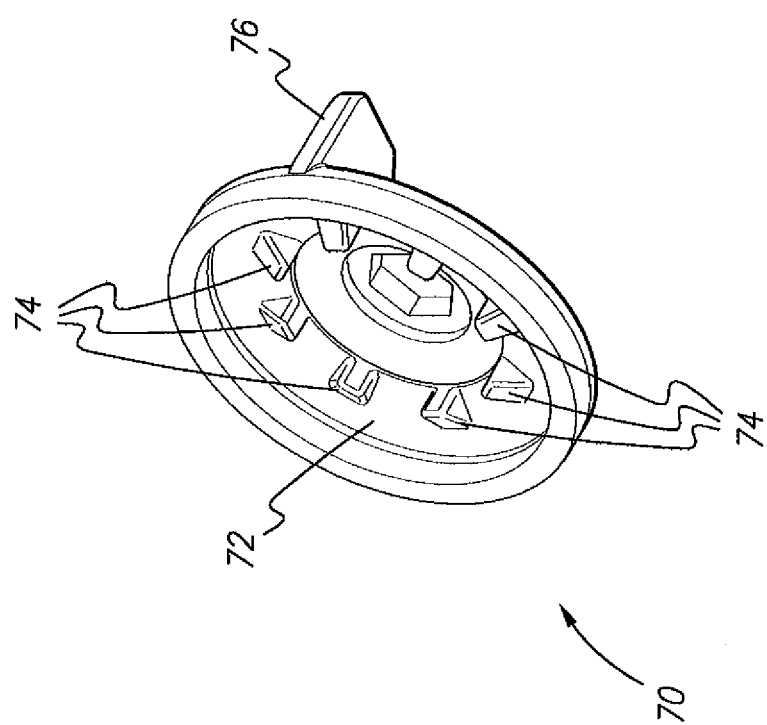
FIG. 11 is a perspective view of the interior of a bearing assembly removal wrench for use with any of the embodiments of a replaceable bearing assembly for a conveyor roller according to the present invention.

In the example of FIGS. 9 and 10, an intermediate tubular insert or sleeve 352 is permanently installed in the end of the hollow tubular roller 354. The insert 352 and roller 354 may be formed of any suitable grade or type of plastic, or even various metals. The insert 352 is permanently and immovably affixed within the roller 354 by any of a number of suitable means, e.g., adhesives, sonic welding, swaging or other mechanical attachment, etc., depending upon the specific materials used. In the example of FIGS. 9 and 10, the insert 352 includes an external circumferential ring or rib 356, and the roller 354 has a mating internal circumferential groove 358. The engagement of the ring or rib 356 of the insert 352 with the mating groove 358 of the roller 354 retains the insert 352 within the roller 354. Alternatively, the insert 352 may have an external circumferential groove and the roller 354 may have an internal circumferential rib. The insert 352 further includes at least one axially disposed key 360, the interior surface of the roller 354 having a corresponding number of mating keyways 362 formed therein. The engagement of the insert key(s) 360 with the corresponding keyway(s) 362 within the roller 354 prevents the insert 352 from rotating within the roller 354. The provision of an insert 352 with internal threads 364 to engage the external threads 320 of the bearing housing sleeve 318 permits the removable threaded installation of the bearing housing 310 within the end of the roller 354 without weakening the roller 354 by cutting internal threads therein. While not illustrated in FIGS. 9 and 10, it will be understood that the bearing housing 310 may include an external circumferential ring and the insert 352 may include a corresponding circumferential internal groove to prevent the housing 310 from backing out of the insert 352, somewhat as in the mating ring 170 of the bearing housing 110 and groove 172 of the roller 154 of FIGS. 4 through 6. Alternatively, the ring and groove may be interchanged between the roller and bearing housing, if desired It will be noted that the outer retaining flanges of the various bearing housing embodiments shown in the drawings and described herein, e.g., the retaining flange 316 of the bearing housing 310 of FIGS. 9 and 10, have outer faces having a plurality of circumferentially arrayed notches formed therein, e.g., the outer face 366 with its notches 368. The outer face 66 of the outer retaining flange 16 of the bearing housing 10 of FIGS. 1 through 3 includes an identical arrangement of notches 68 formed therein, as do other correspondingly designated embodiments. These notches provide for the engagement of a bearing housing installation and removal tool 70, illustrated in FIG. 11. The identical configuration of the notched outer faces of the bearing housings permits the same tool 70 to be used with any of the embodiments disclosed herein. FIG. 11 primarily shows the inner face or bearing housing engagement face 72 of the tool 70, the inner face 72 having a plurality of circumferentially disposed teeth 74 extending therefrom. The teeth 74 are arranged and spaced to engage the mating flanges and notches, e.g., 66/68, 166/168, 266/268, or 366/368 of the outer retaining flanges 16, 116, 216, or 316 of the respective bearing housings 10,110, 210, or 310, as depicted in FIGS. 1, 4, 7, and 9, respectively. A wing or grip flange 76 extends across the opposite outer face (not shown) of the tool 70 to enable the mechanic or technician to rotate the tool 70 as he or she uses it to install or remove a bearing housing into or from the corresponding conveyor roller.

The conveyor rollers may be reused with only the bearing and its housing assembly being replaced, which may be beneficial when considering a conveyor system with perhaps hundreds of rollers. This is even more true in conveyor systems where more costly materials are used, as in the food processing industry, where most components are constructed of corrosion-resistant ("stainless") steel. Moreover, the specific configurations of the bearing housings preclude significant compression of the bearing shell when the bearing is installed within the housing, thereby eliminating distortion of the bearing and resulting premature wear. Accordingly, the replaceable bearing for a conveyor roller will provide greater durability in service, and more economical replacement and repair when such replacement and repair becomes necessary. While a wide variety of different component configurations is disclosed herein, it will be seen that any of these various components, e.g., bearing housings installing in inserts or directly into the rollers, retaining means for the inserts and/or rollers, spring biasing of the roller axle or lack thereof, bushing or C-clip retention of the bearing in the housing, separate or integral bearing cap, etc., may be combined in any practicable manner as desired.

It is to be understood that the present invention is not limited to the embodiments described above, but encompasses any and all embodiments within the scope of the following claims.

I claim:

1. A replaceable bearing for a conveyor roller, comprising:
    a bearing housing having an internal bearing seat and an outer retaining flange, the bearing seat having a bearing cap passage disposed therethrough and an elongate, externally threaded bearing holder sleeve extending therefrom;
    a bearing installed within the bearing housing adjacent the bearing seat, the bearing having an inner surface and an outer surface;
    a bearing cap having a hollow stem, the stem being removably installed through the bearing cap passage of the bearing seat and through the inner surface of the bearing; and
    a bearing retainer disposed upon the stem of the bearing cap, the bearing retainer capturing the bearing upon the stem of the bearing cap between the bearing seat of the bearing housing and the bearing retainer, and retaining the stem of the bearing cap and the bearing installed thereon within the bearing housing.

2. The replaceable bearing for a conveyor roller according to claim 1, further including a tubular roller insert having an internally threaded portion, the externally threaded bearing holder sleeve of the bearing housing being removably threaded into the internally threaded roller insert.

3. The replaceable bearing for a conveyor roller according to claim 1, further including:
    a hollow tubular conveyor roller, the bearing housing being removably disposed within the conveyor roller;
    an axle disposed concentrically within the conveyor roller, the axle passing through the bearing housing and the bearing cap; and
    bearing housing retention means permanently disposed within the conveyor roller for retaining the bearing housing.

4. The replaceable bearing for a conveyor roller according to claim 3 wherein the conveyor roller is internally threaded, the bearing housing being removably threaded directly into the conveyor roller.

5. The replaceable bearing for a conveyor roller according to claim 1 wherein the bearing holder sleeve of the bearing housing has an unthreaded portion adjacent the bearing seat, the bearing being seated within the unthreaded portion of the bearing holder sleeve.

6. The replaceable bearing for a conveyor roller according to claim 5, wherein the unthreaded portion of the bearing holder sleeve has a smaller diameter than the threaded portion thereof.

7. The replaceable bearing for a conveyor roller according to claim 1, wherein the outer retaining flange of the bearing housing has an outer face having a plurality of circumferentially disposed notches therein, the bearing further comprising a bearing housing installation and removal tool, the tool having a bearing housing engagement face having a plurality of teeth extending therefrom, the teeth being adapted to engage the notches of the outer retaining flange of the bearing housing.

8. A replaceable bearing for a conveyor roller, comprising:
a bearing housing having an internal bearing seat and an outer retaining flange, the bearing seat having a bearing cap passage disposed therethrough and an elongate, externally threaded bearing holder sleeve extending therefrom;
a tubular roller insert having an internally threaded portion, the externally threaded bearing holder sleeve being removably threaded into the internally threaded roller insert; and
a bearing installed within the bearing housing adjacent the bearing seat, the bearing having an inner surface and an outer surface.

9. The replaceable bearing for a conveyor roller according to claim 8, further including:
a bearing cap having a hollow stem, the stem being removably installed through the bearing cap passage of the bearing seat and through the inner surface of the bearing; and
a bearing retainer disposed upon the stem of the bearing cap, the bearing retainer capturing the bearing upon the stem of the bearing cap between the bearing seat of the bearing housing and the bearing retainer, and retaining the stem of the bearing cap and the bearing installed thereon within the bearing housing.

10. The replaceable bearing for a conveyor roller according to claim 8, further including:
a hollow, tubular conveyor roller, the roller insert being permanently affixed within the conveyor roller, the bearing housing and bearing being removably disposed within the roller insert; and
an axle disposed concentrically within the conveyor roller, the axle passing through the inner surface of the bearing.

11. The replaceable bearing for a conveyor roller according to claim 8 wherein the bearing holder sleeve has an unthreaded portion adjacent the bearing seat, the bearing being seated within the unthreaded portion of the bearing holder sleeve.

12. The replaceable bearing for a conveyor roller according to claim 11, wherein the unthreaded portion of the bearing holder sleeve has a smaller diameter than the threaded portion thereof.

13. The replaceable bearing for a conveyor roller according to claim 8, wherein the outer retaining flange of the bearing housing has an outer face having a plurality of circumferentially disposed notches therein, the bearing further comprising a bearing housing installation and removal tool, the tool having a bearing housing engagement face having a plurality of teeth extending therefrom, the teeth being adapted to engage the notches of the outer retaining flange of the bearing housing.

14. A replaceable bearing for a conveyor roller and a conveyor roller, comprising in combination:
a hollow, tubular conveyor roller;
an axle disposed concentrically within the conveyor roller;
a bearing housing removably disposed within the conveyor roller and about the axle, the bearing housing having an internal bearing seat and an outer retaining flange, the bearing seat having a bearing cap passage disposed therethrough and an elongate, externally threaded bearing holder sleeve extending therefrom;
a bearing installed within the bearing housing adjacent the bearing seat thereof, the bearing having an inner surface and an outer surface; and
bearing housing retention means permanently disposed within the conveyor roller for retaining the bearing housing.

15. The replaceable bearing for a conveyor roller and conveyor roller combination according to claim 14, further including:
a bearing cap having a hollow stem, the stem being removably installed through the bearing cap passage of the bearing seat and through the inner race of the bearing; and
a bearing retainer disposed upon the stem of the bearing cap, the bearing retainer capturing the bearing upon the stem of the bearing cap between the bearing seat of the bearing housing and the bearing retainer, and retaining the stem of the bearing cap and the bearing installed thereon within the bearing housing.

16. The replaceable bearing for a conveyor roller and conveyor roller combination according to claim 14 further including a tubular roller insert permanently disposed within the conveyor roller, the roller insert having an internally threaded portion, the externally threaded bearing holder sleeve of the bearing housing being removably threaded into the internally threaded roller insert.

17. The replaceable bearing for a conveyor roller and conveyor roller combination according to claim 14 wherein the conveyor roller is internally threaded, the bearing housing being removably threaded directly into the conveyor roller.

18. The replaceable bearing for a conveyor roller and conveyor roller combination according to claim 14 wherein the bearing holder sleeve has an unthreaded portion adjacent the bearing seat, the bearing being seated within the unthreaded portion of the bearing holder sleeve.

19. The replaceable bearing for a conveyor roller and conveyor roller combination according to claim 18, wherein the unthreaded portion of the bearing holder sleeve has a smaller diameter than the threaded portion thereof.

20. The replaceable bearing for a conveyor roller and conveyor roller combination according to claim 14, wherein the outer retaining flange of the bearing housing has an outer face having a plurality of circumferentially disposed notches therein, the bearing further comprising a bearing housing installation and removal tool, the tool having a bearing housing engagement face having a plurality of teeth extending therefrom, the teeth being adapted to engage the notches of the outer retaining flange of the bearing housing.

* * * * *